Dec. 20, 1927.

H. L. HESS 1,653,281

WASHING AND STIRRING APPARATUS

Filed July 8, 1926

WITNESSES
Bernard Aebly
Chris Feinle

INVENTOR
HERBERT L. HESS
BY
ATTORNEYS

Dec. 20, 1927.  
H. L. HESS  
WASHING AND STIRRING APPARATUS  
Filed July 8, 1926

WITNESSES  
Bernard Aeby.  
Chris Feinle.

INVENTOR  
Herbert L. Hess  
BY  
ATTORNEYS

Patented Dec. 20, 1927.

1,653,281

UNITED STATES PATENT OFFICE.

HERBERT LEOPOLD HESS, OF UTUADO, PORTO RICO.

WASHING AND STIRRING APPARATUS.

Application filed July 8, 1926. Serial No. 121,240.

This invention relates to an apparatus for removing the lees from ripe coffee berries whose outer hulls have been removed.

It is well known that a coffee berry has an outer skin or bark, and that when this outer skin or bark is taken off, there is usually found in the berry two grains covered by another hard skin or bark which is later removed after drying the grain. These things are done to produce marketable coffee grains. It has been found that after the first skin or hull is removed from the coffee berry, the two grains found are covered by a somewhat sweet, sticky, dense substance known as "lees" or "lees liquor". To obtain a high grade marketable coffee it is important that the lees be removed from the grains. Up to the present time methods adopted for removing the lees have proved to be unsatisfactory, involving loss of considerable time and also causing an inferior grade of coffee because of failure to absolutely remove the lees.

Therefore it is the principal object of the present invention to produce an apparatus which will be more thoroughly efficient and effectual for removing the lees from coffee berry grains. To this end there is provided a first stage means for subjecting the coffee berry grains to circulating water, while imparting to said grains a circulatory downward movement or stirring action, meanwhile drawing off the surface impurities, and subsequently transferring the same coffee berry grains to a second stage means which subjects the grains to circulating water, while imparting a circulatory and downward movement to the grains, and at the same time maintaining a cleavage of the impurities which is ejected or caused to be separated from the coffee berry grains.

With the foregoing and other objects in view the invention resides in the particular provision, relative disposition and function of the parts hereinafter fully described.

The nature of the invention and its distinguishing features and advantages will appear when the following specification is read in connection with the accompanying drawings, in which Figure 1 is a central vertical sectional view through the apparatus of the present invention.

Figures 1, 4:
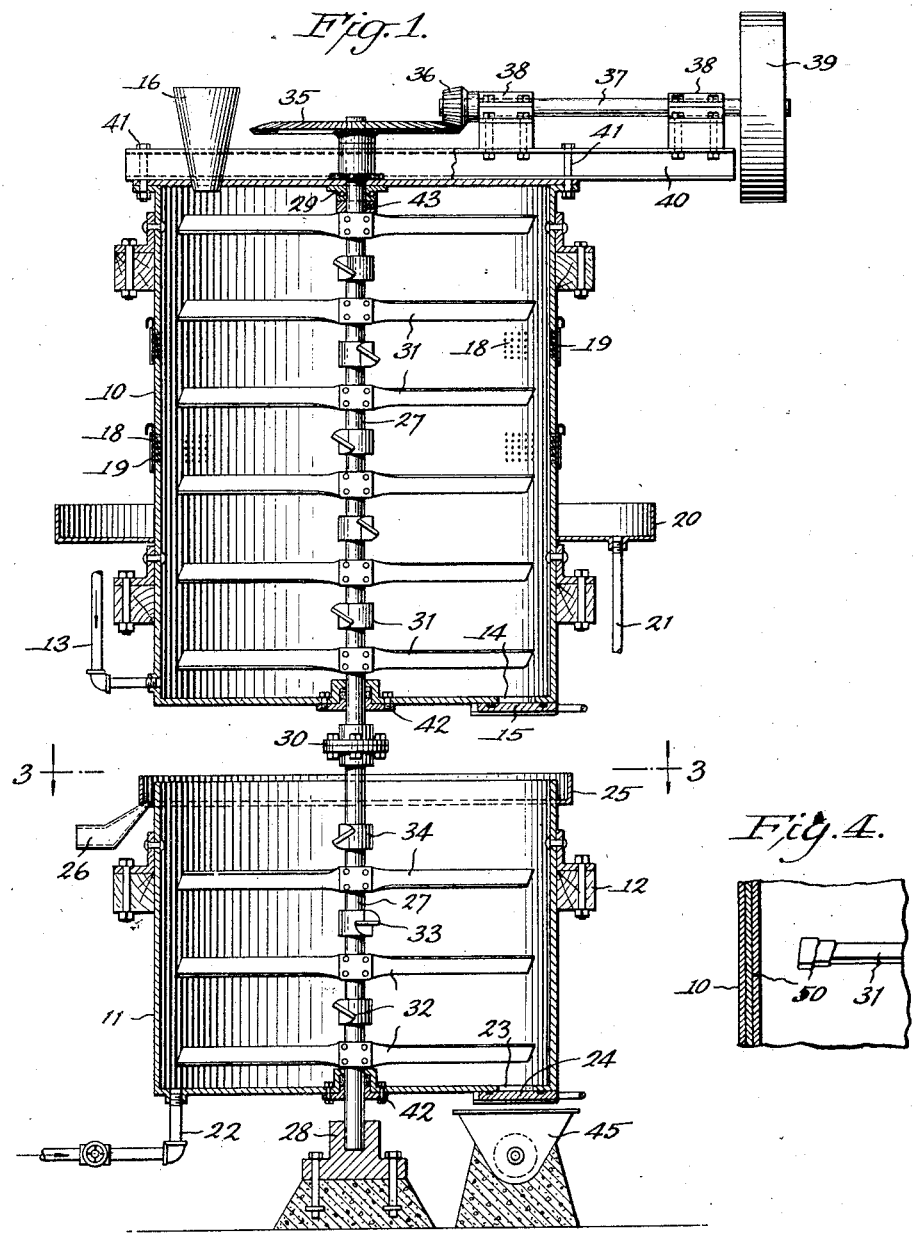
Fig. 4 is a detail sectional view showing a modification.
Figure 2:
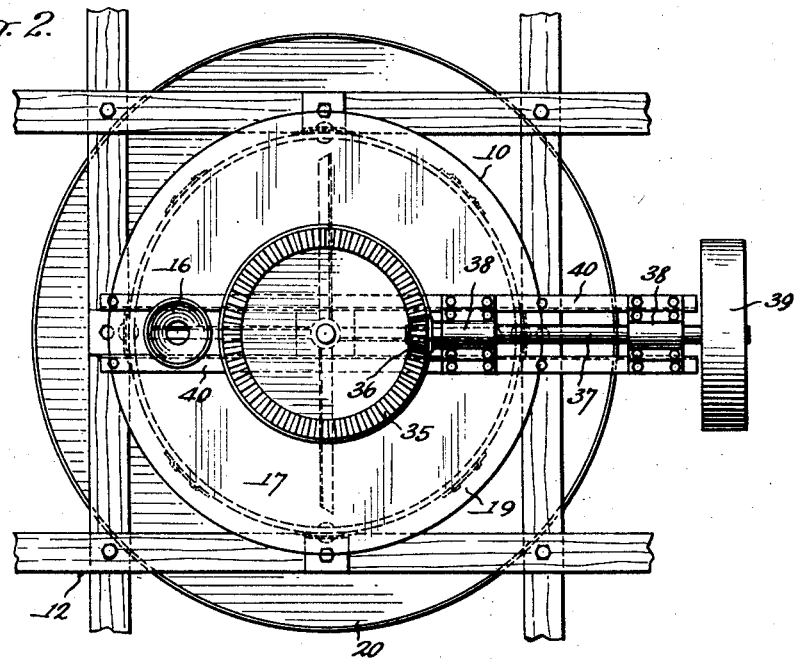
Fig. 2 is a top plan view.
Figure 3:
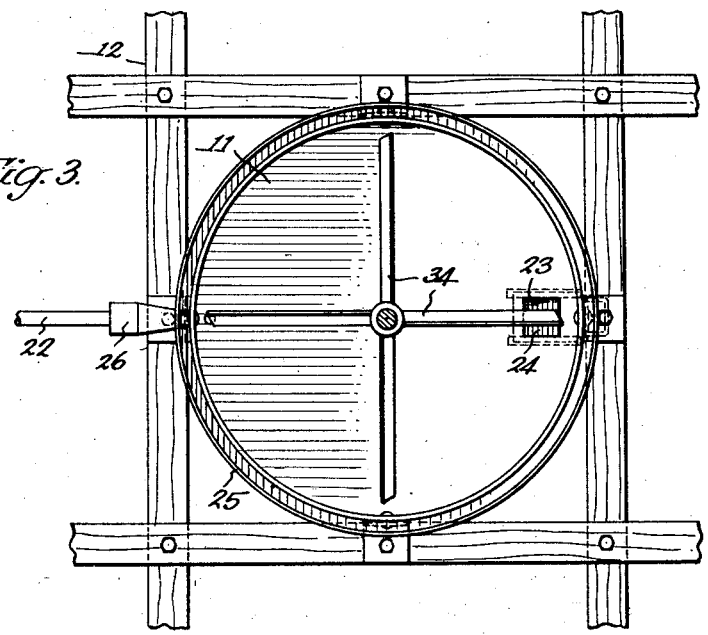
Fig. 3 is a sectional view taken on the line 3—3 of Fig. 1.

Referring now more particularly to the drawings it will be apparent that the apparatus of the present invention includes an upper tank 10 and a lower tank 11 which are rigidly held in place by a supporting structure or framework 12 of any preferred construction. The upper tank 10 has a water inlet 13, an outlet 14 in the bottom wall thereof which is controlled by a slide 15, an inlet or funnel 16 carried by the top wall 17, and perforated portions 18 in the side wall, each of which perforated portions 18 is controlled by a slide 19. Arranged in surrounding relationship with respect to the upper tank 10 is a trough 20, the said trough being arranged below the perforated portions 18 and having an outlet 21. The lower tank 11 has a water inlet 22 and an outlet 23 in the bottom wall thereof which is controlled by a slide 24. The lower tank 11 is open at the upper end, and surrounding the upper end and extending somewhat above the same is a trough 25 having an outlet 26. The lower tank 11 is in axial alignment with the upper tank 10, is substantially of the same diameter, and in the present instance is somewhat shorter than the tank 10.

Stirring mechanism is provided and operates in conjunction with the tanks 10 and 11. The said stirring mechanism includes a shaft 27 whose lower end is supported in a stand bearing 28, and whose upper end is journaled in a roller bearing 29 carried by the top wall 17. The shaft 27 is of two parts which are coupled together by a coupling 30. The coupling 30 permits ready separation of the tanks. Secured to the shaft 27 and arranged within the upper tank 10 are arms or blades 31 which extend radially from the shaft. The arms or blades 31 are arranged in superposed pairs alternately at right angles with respect to each other. Each blade is pitched or disposed at an angle so that when the shaft 27 is rotated clockwise the contents of the tank will have imparted thereto a circulatory and downward movement. Attached to the shaft 27 and arranged within the lower tank 11 are arms or blades 32, 33 and 34. The blades extend radially from the shaft 27. The blades 32 are arranged in pairs, there being three pairs in the present instance, and the said blades 32 are pitched or disposed at an angle so that when the shaft 37 is rotated clockwise the contents in the lower part of the tank 11 will have imparted thereto a circulatory and downward movement. The blades 33 of which there are two are disposed horizontally so as to maintain a balance of equality between the upper and lower portion of the contents of the tank, or in other words to cause a division or cleavage. The blades 34 of which there are two pairs are pitched or disposed at an angle so as to cause a circulatory and upward movement of the upper portion of the contents of the tank.

In order to drive the shaft 27 and the arms or blades connected thereto, the upper end of the shaft 27 is provided with a bevel gear 35 which meshes with a bevel gear 36 keyed to a shaft 37 mounted in bearings 38, there being a pulley 39 on the shaft 37. The bearings 38 are secured to suitable supports 40 in the form of I-beams attached as at 41 to the upper end of the tank 10.

Suitable stuffing boxes 42 are provided which prevent any leakage at the points where the shaft 27 passes through the bottom walls respectively of the tanks 10 and 11. A suitable collar 43 is secured to the shaft 27 and is disposed against the bearing 29 to prevent vertical movement of the shaft 27.

The operation of the apparatus is as follows: the pulley 39 is set in motion by any suitable source of power. The pulley is caused to rotate in a direction which will cause the shaft 27 to turn clockwise. Water is admitted into the cylinder 10 through the pipe 13 until the tank is about one-quarter filled. The raw lees covered coffee grains are admitted into the tank 10 through the funnel 16 until there is little more coffee grains than water. The blades 31 keep the mixture of coffee grains and water in a continuous circulatory motion and at the same time presses the coffee grains down softly against the bottom of the tank. As the lees is partly washed off the coffee grains, the water gets more dense or sort of syrupy and moves upwardly. The slides 19 are partly opened occasionally so that the syrupy water may flow out carrying the lees it has dissolved, while fresh water is constantly coming in the inlet 13. It will therefore be apparent that fresh water is admitted constantly into the tank 10 while the impure water carrying removed lees or other impurities flows out of the tank. When time enough has elapsed, the slide 15 is partly opened so that the coffee grains and water may flow out of the outlet 14 into the lower tank 11. At the same time more coffee grains are admitted into the upper tank 10 through the funnel 16. It is at this time that the apparatus is in full operation and acts continuously. Partly washed coffee grains are allowed to enter the lower tank 11 while other lees laden coffee grains are admitted into the upper tank 10. The coffee grains in the lower tank 11 are subjected to water which is admitted into the tank 11 through the inlet 22. At the same time the blades 32 impart to the coffee grains a circulatory and downward movement. At the same time the blades 33 travel through a horizontal path and neither press downward or upward, but simply equalize the motion and cause a cleavage of the upper water, while the blades 34 move the cleavage upwardly and out of the tank 11 into the trough 25. The impure water entering the trough 25 is led from the same through the outlet 26 to any suitable point. The trough 20 serves for receiving the overflow from the tank 10, the impure water entering the said trough is led therefrom through the outlet 21 to any suitable point.

When the coffee grains in the lower tank 11 have been freed from all lees, the slide 24 is moved to an open position to permit the coffee grains to fall into a perforated conveyor 45 which separates the coffee grains from the water, the coffee grains being conveyed to any suitable point.

As shown in Fig. 4 cork and rubber may be used for lining the inside of each tank and for covering the blades, the cork and rubber being indicated at 50.

It is to be understood that the invention is not restricted to the precise arrangement of parts shown and described, as details of construction may be modified and rearranged without departing from the spirit of the invention, the scope of which is limited only by the terms of the appended claims.

I claim:

1. For removing the lees from ripe coffee berries whose outer bark has been removed, a washing and stirring apparatus comprising superposed tanks, each tank capable of containing a quantity of water and ripe coffee berries, each tank having an inlet for introducing the water into the tank, and each tank having an outlet in the bottom wall thereof for discharging the coffee berries, the upper tank having side wall liquid outlets, said upper tank having an inlet for the introduction of the coffee berries thereinto, means for controlling each of the outlets of the tanks, and stirring means operable in each tank for stirring the contents therein.

2. For removing the lees from ripe coffee berries whose outer bark has been removed, a washing and stirring apparatus comprising superposed tanks, each tank capable of containing a quantity of water and ripe coffee berries, each tank having an inlet for introducing the water into the tank, and each tank having an outlet in the bottom wall thereof for discharging the coffee berries, the upper tank having side wall liquid outlets, said upper tank having an inlet for the introduction of the coffee berries thereinto, means for controlling each of the outlets of the tanks, and stirring means operable in each tank for stirring the contents therein, said stirring means capable of imparting a circulatory and downward movement to the coffee berries within each of the tanks, also a circulatory and upward movement to a portion of the contents in the lower tank.

3. For removing the lees from ripe coffee berries whose outer bark has been removed, a washing and stirring apparatus comprising superposed tanks, each tank capable of containing a quantity of water and ripe coffee berries, each tank having an inlet for introducing the water into the tank, and each tank having an outlet in the bottom wall thereof for discharging the coffee berries, the upper tank having side wall liquid outlets, said upper tank having an inlet for the introduction of the coffee berries thereinto, means for controlling each of the outlets of the tanks, stirring means operable in each tank for stirring the contents therein, and a trough surrounding the upper tank below the side wall outlets thereof, said trough having an outlet.

4. An apparatus for removing lees from coffee berries whose outer bark has been removed, comprising a first stage means for subjecting the coffee berries to the action of circulating water while imparting to the coffee berries a circulatory and downward movement, and a second stage means associated with the first stage means for receiving and subjecting the same coffee berries to the action of circulating water while imparting to the coffee berries a circulatory and downward movement and an upward movement to the surface water and impurities.

5. An apparatus for removing lees from coffee berries whose outer bark has been removed, comprising a first stage means for subjecting the coffee berries to the action of circulating water while imparting to the coffee berries a circulatory and downward movement, and a second stage means associated with the first stage means for receiving and subjecting the same coffee berries to the action of circulating water while imparting to the coffee berries a circulatory and downward movement and an upward movement to the surface water and impurities, said first stage means including devices for controlling the circulation of the water.

6. An apparatus for removing lees from coffee berries whose outer bark has been removed, comprising a first stage means for subjecting the coffee berries to the action of circulating water while imparting to the coffee berries a circulatory and downward movement, and a second stage means associated with the first stage means for receiving and subjecting the same coffee berries to the action of circulating water while imparting to the coffee berries a circulatory and downward movement and an upward movement to the surface water and impurities, said first stage means including devices arranged at different levels for controlling the circulation of the water.

7. An apparatus for removing lees from coffee berries whose outer bark has been removed, comprising a closed upper tank, a lower tank open at the top and arranged beneath the upper tank in alignment therewith, means for introducing water into each tank at the bottom thereof, said upper tank having an inlet for the introduction of coffee berries thereinto, said upper tank having an outlet for discharging the coffee berries therefrom into the lower tank, said lower tank having an outlet for discharging the coffee berries therefrom, the upper tank having liquid outlets in the side wall thereof, means for controlling each of the outlets of each of the tanks, and means operable in each tank for stirring the contents therein.

8. An apparatus for removing lees from coffee berries whose outer bark has been removed, comprising a closed upper tank, a lower tank open at the top and arranged beneath the upper tank in alignment therewith, means for introducing water into each tank at the bottom thereof, said upper tank having an inlet for the introduction of coffee berries thereinto, said upper tank having an outlet for discharging the coffee berries therefrom into the lower tank, said lower tank having an outlet for discharging the coffee berries therefrom, the upper tank having liquid outlets in the side wall thereof, means for controlling each of the outlets of each of the tanks, means operable in each tank for stirring the contents therein, and a trough having an outlet surrounding each tank to receive outflowing liquid therefrom.

HERBERT LEOPOLD HESS.